C. L. BASTIAN.
FLUID PRESSURE REGULATING VALVE.
APPLICATION FILED MAY 24, 1920.
1,408,925.
Patented Mar. 7, 1922.
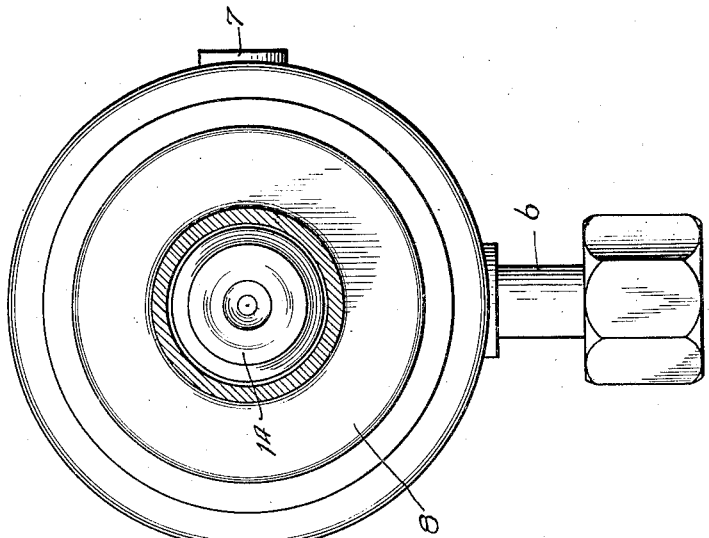
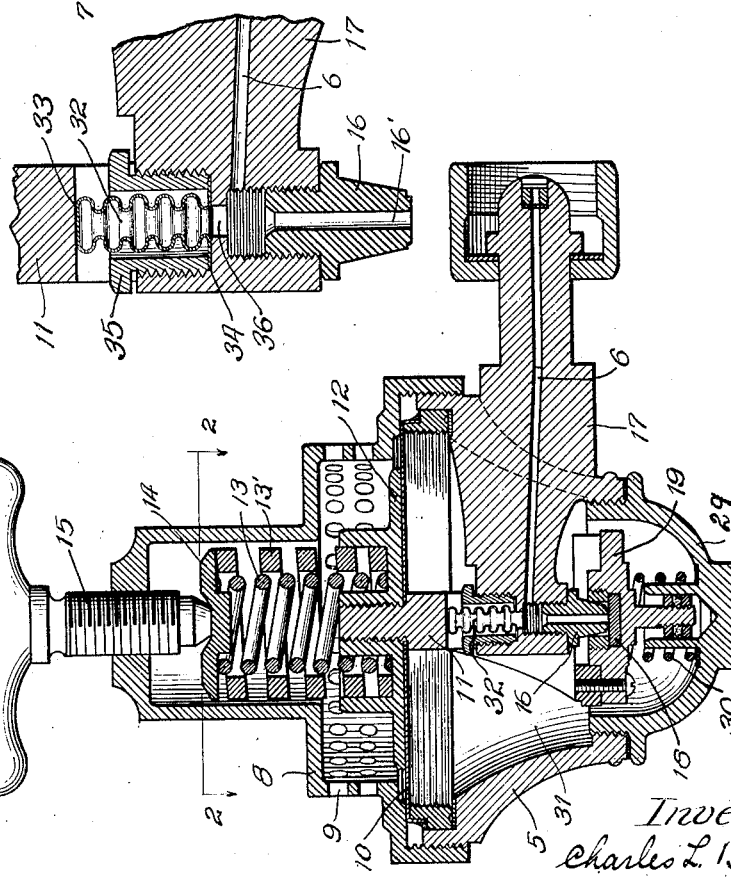
Inventor:
Charles L. Bastian
By: Wm. O. Bell Atty.

UNITED STATES PATENT OFFICE.

CHARLES L. BASTIAN, OF CHICAGO, ILLINOIS.

FLUID-PRESSURE-REGULATING VALVE.

1,408,925.  Specification of Letters Patent.  Patented Mar. 7, 1922.

Application filed May 24, 1920. Serial No. 383,647.

*To all whom it may concern:*

Be it known that I, CHARLES L. BASTIAN, a citizen of the United States, residing at Chicago, in the county of Cook and State of Illinois, have invented certain new and useful Improvements in Fluid-Pressure-Regulating Valves, of which the following is a specification.

This invention relates to improvements in fluid pressure regulating valves which are used for many purposes including the regulation and delivery of gases to oxyacetylene welding and cutting apparatus at desired pressures.

The object of the invention is to provide means of simple construction for automatically maintaining the delivery of a predetermined volume of gas regardless of the fact that the pressure supply is constantly decreasing; and more specifically, my object is to utilize the pressure supply through the medium of a contractible member to automatically control the pressure sensitive means and enlarge the gas outlet opening between the nozzle and the disk in proportion to the decrease of pressure supply to constantly maintain an even delivery of gas in a uniform volume.

In the drawings I have illustrated a selected embodiment of the invention and referring thereto, Fig. 1 is a vertical section through a fluid pressure regulating valve embodying the invention.

Fig. 2 is a plan view partly in section on the line 2—2 of Fig. 1.

Fig. 3 is a detail enlarged sectional view.

Referring to the drawings the valve casing comprises the body 5 provided with a gas inlet 6 and an outlet 7 through which the gas may be delivered to the work. A pressure gauge is generally connected to another opening 7' in the body located opposite the opening 7. A bonnet 8 is threadedly engaged with the body 5 and is preferably provided with openings 9 to permit instant escape of pressure without blowing off the bonnet in the event that the diaphragm is broken. The diaphragm 10 is secured between the yoke 11 and the collar 12 which threadedly engages the yoke. A pair of springs 13, 13' of relatively different strength are disposed one within the other within the bonnet and engaging the collar 12. A button 14 forms a bearing for the adjusting screw 15 which operates through the bonnet. An inlet nozzle 16 is threadedly secured in the bridge 17 forming part of the body and this nozzle co-operates with a disk 18 which is carried by a support 19 secured to the yoke 11.

The construction thus far described is more fully set forth in my pending application Serial No. 272,421 filed January 22, 1919, and in my application Serial No. 383,646 filed concurrently herewith, but it will be understood that I reserve the right to embody the present invention in any other valves to which it may be applicable.

It is customary to turn the screw 15 to adjust the tension of the springs 13 and 13', to permit the desired pressure, as shown by the gauge, to be delivered to the work. The tension of the regulating springs overcomes the tension of balance spring 30 within the back cap 29 and operates the diaphragm to carry the disk 18 away from the nozzle sufficiently to admit pressure to the chamber 31 in the body at the predetermined pressure to be delivered. Since the screw adjustment is made with relation to the initial pressure supplied, it is apparent that as the pressure supply decreases, the screw must be readjusted if the disk and the nozzle are to be preserved in proper operative relation to maintain the desired uniformity in delivery volume. As before stated, it has been customary in the past to manually adjust the screw from time to time while the valve is in use in an effort to proportion the tension of the springs to the pressure supply as the supply decreases. My invention takes care of this automatically by utilizing the pressure supply to control the spring tension after the initial setting so that the spring tension is automatically adjusted in proportion to the variation in pressure supply as the supply decreases.

I provide an expansible and contractible member 32 which is arranged in communication with the gas inlet and is adapted to be operated by the pressure supply to control the spring tension and the operation of the diaphragm. This member 32 may be made, as shown in the drawings, in the form of a corrugated or fluted cylinder closed at its outer end 33 and provided with an outwardly projecting flange 34 at its inner end. The bridge 17 is bored and threaded to receive the gland 35 which engages the flange 34 and secures the member in the bridge with its inner open end adjacent to the passage 36 which communicates with the passage 16′ in the nozzle and the inlet passage 6. The outer closed end of the member is arranged in engagement with the yoke 11.

The member 32 will, preferably, be made of thin metal and corrugated or fluted in a manner to provide for the necessary expansion and contraction. The initial pressure supply expands the member 32 lengthwise and as the pressure supply decreases the member will contract and permit the regulating springs to stretch slightly and increase the opening between the disk and the nozzle. It will be readily understood that as the pressure supply decreases, the member 32 will contract or will permit itself to be contracted by the pressure of the yoke to correspondingly increase the separation of the disk from the nozzle so that the gas will be delivered at a constant volume and desired pressure regardless of the decrease of pressure supply, and this is accomplished automatically and without the necessity of manual adjustment of the springs.

The expansion and contractile member operates like a diaphragm and controls the pressure sensitive means of the valve so that it is automatically operated to increase the outlet opening in proportion to the decrease of supply pressure.

It is my opinion that the construction I have illustrated and described is well adapted to secure the results sought for, but I reserve the right to make all such changes therein as fairly fall within the scope of the following claims.

I claim:

1. In a pressure regulating valve, the combination of a casing providing a chamber having an inlet and an outlet, pressure sensitive means for controlling the inlet to said chamber, and a cylindrical member operated by the pressure supply diaphragmatically for automatically controlling said pressure sensitive means to maintain a constant inlet volume as the pressure supply decreases.

2. In a pressure regulating valve, the combination of a casing providing a chamber having an inlet and an outlet, pressure sensitive means for controlling the inlet to said chamber, and a corrugated cylinder communicating with the pressure supply and expansible and contractible lengthwise for automatically controlling the pressure sensitive means to maintain a constant inlet volume as the pressure supply decreases.

3. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle and comprising a yoke, and a diaphragmatic-cylindrical member engaging said yoke and operated by the pressure supply for controlling the pressure sensitive means to maintain a constant inlet volume as the pressure supply decreases.

4. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle and comprising a yoke, a diaphragm, and spring tension on the diaphragm, and a diaphragmatic cylinder mounted in the casing and having its outer end closed and arranged to operatively engage the yoke and its inner end open and in communication with the pressure supply for automatically controlling said pressure sensitive means to maintain a constant inlet volume as the pressure supply decreases.

CHARLES L. BASTIAN.